(12) United States Patent
Kang

(10) Patent No.: US 9,362,750 B2
(45) Date of Patent: Jun. 7, 2016

(54) ENERGY STORAGE SYSTEM AND METHOD FOR CONTROLLING THE SAME

(75) Inventor: Jin-Wook Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 524 days.

(21) Appl. No.: 13/610,828

(22) Filed: Sep. 11, 2012

(65) Prior Publication Data

US 2013/0141051 A1    Jun. 6, 2013

Related U.S. Application Data

(60) Provisional application No. 61/566,985, filed on Dec. 5, 2011.

(51) Int. Cl.
*H02J 7/34* (2006.01)
*H02J 3/32* (2006.01)
*H02J 7/04* (2006.01)

(52) U.S. Cl.
CPC . *H02J 3/32* (2013.01); *H02J 7/047* (2013.01); *H02J 7/34* (2013.01)

(58) Field of Classification Search
CPC ............... H02J 7/34; H02J 7/047; H02J 3/32
See application file for complete search history.

(56) References Cited

U.S. PATENT DOCUMENTS

| | | | | |
|---|---|---|---|---|
| 5,646,508 | A * | 7/1997 | van Phuoc et al. | 320/152 |
| 5,815,389 | A * | 9/1998 | Plow et al. | 363/67 |
| 5,828,203 | A * | 10/1998 | Lindeboom et al. | 320/150 |
| 5,844,327 | A * | 12/1998 | Batson | 307/64 |
| 6,075,343 | A * | 6/2000 | Hsu | 320/134 |
| 6,274,950 | B1 * | 8/2001 | Gottlieb et al. | 307/66 |
| 6,608,468 | B2 * | 8/2003 | Nagase | 320/132 |
| 6,661,203 | B2 * | 12/2003 | Wolin | H02J 7/0091 320/128 |
| 7,317,298 | B1 * | 1/2008 | Burns et al. | 320/107 |
| 7,402,982 | B2 * | 7/2008 | Ito | B60L 3/0046 104/287 |
| 7,411,373 | B2 * | 8/2008 | Tashiro et al. | 320/150 |
| 7,649,342 | B2 * | 1/2010 | Hajiaghajhani | 320/153 |
| 7,799,301 | B2 | 9/2010 | Kajiya et al. | |
| 7,808,212 | B2 * | 10/2010 | Litingtun et al. | 320/153 |
| 7,948,212 | B2 * | 5/2011 | Odaohhara | 320/150 |
| 8,058,846 | B2 * | 11/2011 | Kim | H02J 7/0011 320/134 |

(Continued)

FOREIGN PATENT DOCUMENTS

| | | |
|---|---|---|
| JP | 2006-210244 | 8/2006 |
| JP | 2010-140863 | 6/2010 |

(Continued)

OTHER PUBLICATIONS

SIPO Office action dated Dec. 3, 2015, with English translation, corresponding to Chinese Patent application, 201210513100.5, (34 pages).

(Continued)

*Primary Examiner* — Naum B Levin
(74) *Attorney, Agent, or Firm* — Lewis Roca Rothgerber Christie LLP

(57) ABSTRACT

An energy storage system configured to be coupled to at least one of a power generation system, a grid, or a load, the energy storage system including a battery system including at least one rack, the at least one rack including a rack controller, and a system controller configured to control a charging operation and a discharging operation of at least one battery on the at least one rack in accordance with a temperature of the at least one battery.

14 Claims, 6 Drawing Sheets

(56) References Cited

U.S. PATENT DOCUMENTS

| | | | |
|---|---|---|---|
| 8,143,853 B2* | 3/2012 | Jestin | H01M 10/482 320/116 |
| 8,486,548 B2* | 7/2013 | Ueda et al. | 429/61 |
| 8,552,693 B2* | 10/2013 | Paryani | 320/152 |
| 8,803,482 B2* | 8/2014 | Ueki | H01M 10/0525 320/134 |
| 9,000,716 B2* | 4/2015 | Kanbayashi | B60K 6/48 320/104 |
| 2002/0153865 A1* | 10/2002 | Nelson et al. | 320/152 |
| 2004/0257041 A1* | 12/2004 | Nagaoka | 320/128 |
| 2006/0226712 A1* | 10/2006 | Eldredge | 307/154 |
| 2007/0046261 A1* | 3/2007 | Porebski | 320/132 |
| 2008/0278111 A1* | 11/2008 | Genies et al. | 320/101 |
| 2009/0085519 A1* | 4/2009 | Kim | 320/134 |
| 2010/0136390 A1* | 6/2010 | Ueda et al. | 429/61 |
| 2010/0151327 A1 | 6/2010 | Nakahara et al. | |
| 2012/0221287 A1* | 8/2012 | Ioannidis | 702/132 |
| 2014/0236366 A1* | 8/2014 | Livadaras et al. | 700/286 |

FOREIGN PATENT DOCUMENTS

| | | |
|---|---|---|
| KR | 10-2007-0058678 | 6/2007 |
| KR | 10-0749353 B1 | 8/2007 |
| KR | 10-2008-0020087 A | 3/2008 |
| KR | 10-2008-0023831 A | 3/2008 |
| KR | 10-2008-0047065 | 5/2008 |
| KR | 10-0877675 B1 | 1/2009 |
| KR | 10-2010-0041727 A | 4/2010 |
| KR | 10-2010-0109669 A | 10/2010 |

OTHER PUBLICATIONS

English machine translation of Japanese Publication 2006-210244 dated Aug. 10, 2006, listed above, (12 pages).

* cited by examiner

ENERGY STORAGE SYSTEM AND METHOD FOR CONTROLLING THE SAME

CROSS-REFERENCE TO RELATED APPLICATION

This application claims priority to and the benefit of U.S. Provisional Application No. 61/566,985, filed on Dec. 5, 2011 in the USPTO, the disclosure of which is incorporated herein in their entirety by reference.

BACKGROUND

1. Field

One or more embodiments of the present invention relate to an energy storage system and a method of controlling the same.

2. Description of Related Art

As destruction of the environment and depletion of resources become severe, interest in a system capable of storing energy and effectively utilizing the stored energy increases. There is also interest in new renewable energy that causes little or no pollution during a power generation process. An energy storage system may include a system for coupling new renewable energy, a battery system for storing power, and an existing grid. This area of technology has recently undergone much research in response to environmental changes.

Such an energy storage system has various operating modes according to conditions of the new renewable energy, the battery system, the grid, and the load, which are related to one another, and conversion between the various operating modes should be stably performed. In particular, locations or environments where an energy storage system is installed may vary. Accordingly, for all different cases, it may be desirable to design a battery system to be stably charged and discharged.

SUMMARY

One or more embodiments of the present invention include an energy storage system capable of charging and discharging a battery at a proper temperature, and a method of controlling the energy storage system.

According to one embodiment of the present invention, there is provided an energy storage system configured to be coupled to at least one of a power generation system, a grid, or a load, the energy storage system including a battery system including at least one rack, the at least one rack including a rack controller, and a system controller configured to control a charging operation and a discharging operation of at least one battery on the at least one rack in accordance with a temperature of the at least one battery.

The rack controller may be configured to measure the temperature of the at least one battery when the charging operation or the discharging operation is performed.

The rack controller may further be configured to transmit the measured temperature to the system controller.

The rack controller may be configured to transmit the measured temperature to the system controller periodically.

The rack controller may be configured to transmit the measured temperature to the system controller in response to a command from the system controller to transmit the measured temperature.

The rack controller may further be configured to determine whether or not more than a reference time has elapsed since the measuring of the temperature, and to measure the temperature again and transmit the measured temperature to the system controller when more than the reference time has elapsed.

The system controller may include a battery temperature determination unit configured to compare the measured temperature with a reference temperature.

The reference temperature may be selectable.

The system controller may further include a current controller configured to control a first-current charging operation or a first-current discharging operation of the at least one battery when the measured temperature is greater than or equal to the reference temperature, or control a second-current charging operation or a second-current discharging operation when the measured temperature is less than the reference temperature, and the first current may be greater than the second current.

The system controller may be configured to change the first-current to the second-current when the measured temperature becomes greater than or equal to the reference temperature.

The system controller may be configured to determine receipt of the measured temperature from the rack controller.

The energy storage system may further include a converter configured to change a current, and the current controller may be configured to control the converter to determine current level between the first current and the second current.

The rack controller may include a temperature measuring unit configured to measure the temperature of the at least one battery.

The rack may further include at least one battery tray on which the at least one battery is located, at least one battery tray including a tray controller, and the system controller may be configured to receive temperature data of the at least one battery from the tray controller of the at least one battery tray corresponding to the at least one battery.

The energy storage system may further include a rack bus, and the rack controller and the tray controller of the at least one battery tray may be configured to communicate with each other via the rack bus.

The battery system may further include a rack protection circuit configured to block power supply under control of the rack controller.

The rack protection circuit may further be configured to measure a voltage and a current of the battery system, and to transmit the measured voltage and the measured current to the system controller.

According to another embodiment of the present invention, there is provided a method of controlling charging or discharging of a battery in an energy storage system configured to be coupled to at least one of a power generator, a grid, or a load, the method including measuring a temperature of the battery, comparing the measured temperature of the battery with a reference temperature, and controlling a charging operation or a discharging operation of the battery in accordance with the measured temperature.

The battery may be controlled to have a second-current charging operation or a second-current discharging operation when the measured temperature is less than the reference temperature, and to have a first-current charging operation or a first-current discharging operation when the measured temperature is greater than or equal to the reference temperature, and a second current corresponding to the second-current charging operation or the second-current discharging operation may be less than a first current corresponding to the first-current charging operation or the first-current discharging operation.

DETAILED DESCRIPTION

Figure 1:
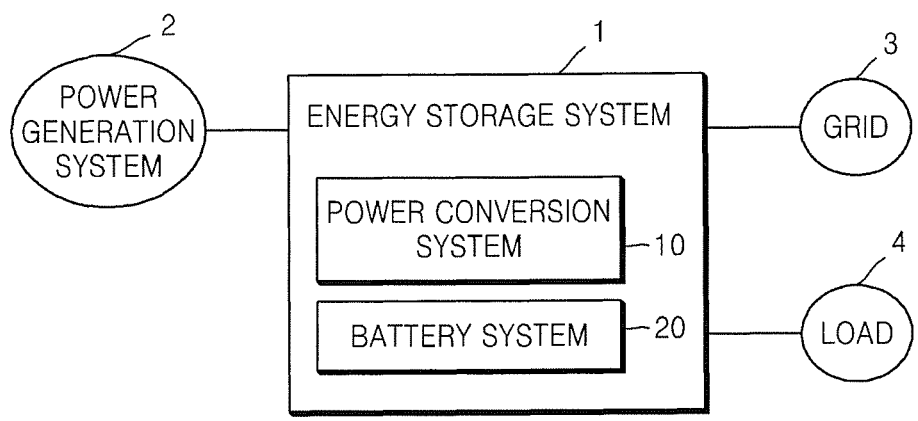
FIG. 1 is a schematic block diagram of an energy storage system and peripheral devices, according to an embodiment of the present invention.

Embodiments of the present invention will now be described more fully with reference to the accompanying drawings, in which exemplary embodiments of the present invention are shown. The exemplary embodiments may, however, be embodied in many different forms without departing from the spirit and the scope of the present invention. As the present invention is not limited to the embodiments described in the present description, it should be understood that the present invention includes every kind of variation and alternative equivalents included in the spirit and scope of the present invention. In the description, the detailed descriptions of well-known functions and structures may be omitted so as not to hinder the understanding of the exemplary embodiments of the present invention.

The terminology used herein is for the purpose of describing particular embodiments only, and the used terminology is not intended to be limiting of the exemplary embodiments of the present invention. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference will now be made in detail to embodiments of the present invention, examples of which are illustrated in the accompanying drawings, wherein like reference numerals refer to like elements throughout, and thus, repeated description will be omitted.

FIG. 1 is a schematic block diagram of an energy storage system 1 and peripheral devices, according to an embodiment of the present invention.

Referring to FIG. 1, the energy storage system 1 of the present embodiment is coupled to a power generation system 2 and a grid 3 to supply power to a load 4.

The power generation system 2 is a system for generating power using an energy source, and supplies the generated power to the energy storage system 1. The power generation system 2 of the present embodiment may be a solar power generation system, a wind power generation system, a tidal power generation system, or the like. However, the present invention is not limited thereto. The power generation system 2 of the present embodiment may be any power generation system that generates power using renewable energy such as, for example, solar heat or geothermal heat. In particular, a solar cell for generating electric energy using solar light may be installed in a house or a factory, and thus may be efficiently used in the energy storage system 1 installed in a house or a factory. The power generation system 2 of the present embodiment includes a plurality of power generation modules arranged in parallel, and generates power using each power generation module, thereby configuring a large capacity energy system.

The grid 3 includes a power generating station, an electric power substation, a power line, and the like. When the grid 3 is in a normal state, the grid 3 supplies power to the energy storage system 1 to allow the power to be supplied to the load 4 and/or a battery system 20, and/or the grid 3 receives power from the energy storage system 1. When the grid 3 is in an abnormal state, power supply from the grid 3 to the energy storage system 1, as well as power supply from the energy storage system 1 to the grid 3, are stopped.

The load 4 consumes power generated by the power generation system 2, power stored in the battery system 20, or power supplied from the grid 3. For example, the load 4 may be a house, a factory, or the like.

The energy storage system 1 includes the battery system 20 for storing power, and a power conversion system (hereinafter, referred to as a PCS) 10 that properly converts power of the battery system 20, power of the power generation system 2, and power of the grid 3 into power appropriate for a destination, and then supplies the appropriate power to the destination (e.g., load 4 or grid 3).

The energy storage system 1 may store power generated by the power generation system 2 in the battery system 20, and may supply the generated power to the grid 3. The energy storage system 1 may supply power stored in the battery system 20 to the grid 3, or may store power supplied from the grid 3 in the battery system 20. Also, when the grid 3 is in an abnormal state, for example, when a power failure occurs in the grid 3, the energy storage system 1 performs an uninterruptible power supply (UPS) operation to supply power to the load 4. Also, when the grid 3 is in a normal state, the energy storage system 1 may supply the power generated by the power generation system 2 and the power stored in the battery system 20 to the load 4.

Figure 2:
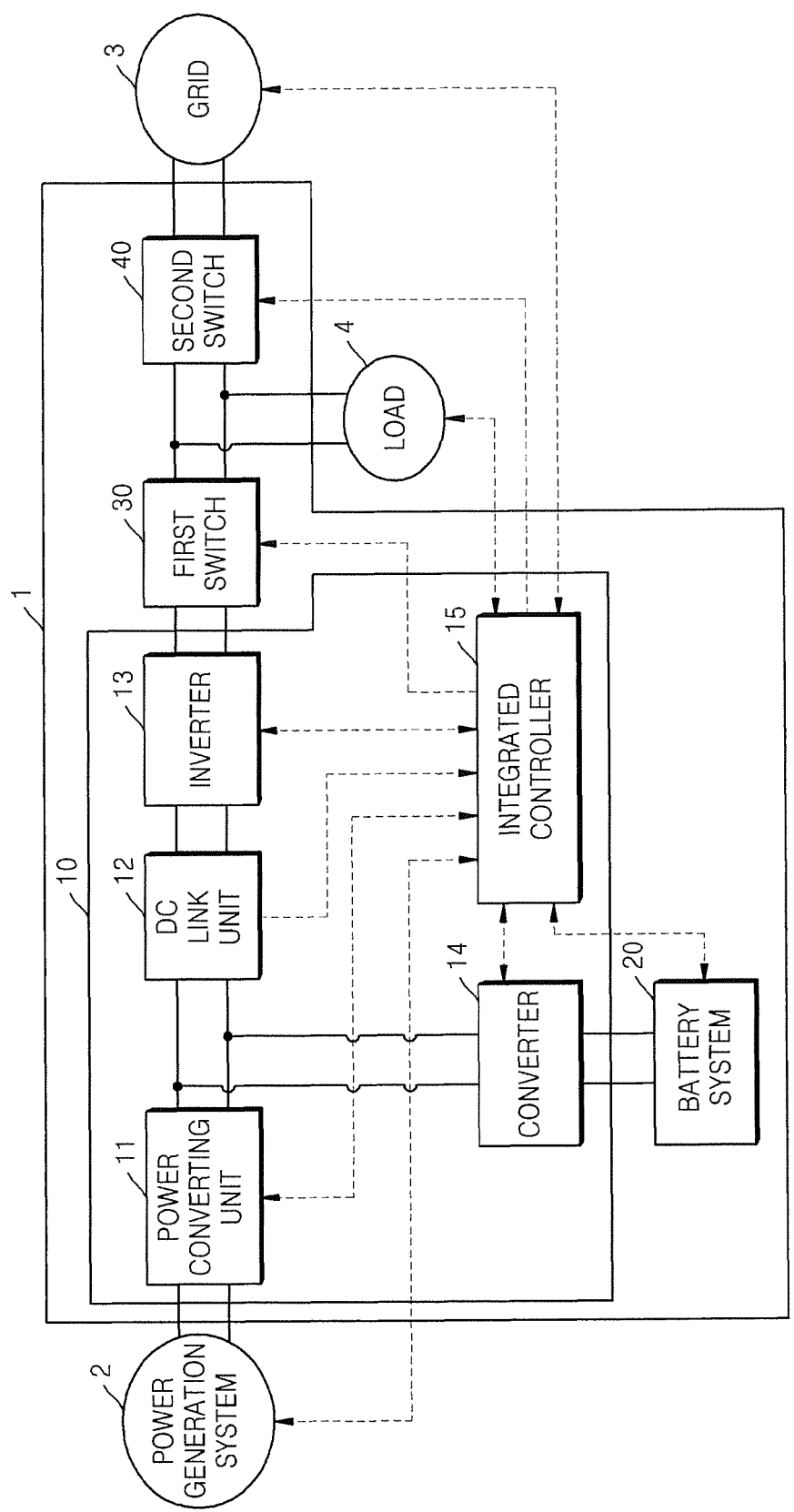
FIG. 2 is a block diagram of a configuration of an energy storage system, according to another embodiment of the present invention.

FIG. 2 is a block diagram of the energy storage system 1, according to an embodiment of the present invention.

The energy storage system 1 includes the PCS 10 for controlling a power conversion, the battery system 20, a first switch 30, and a second switch 40.

The PCS 10 converts power of the power generation system 2, the grid 3, and the battery system 20 into power appropriate for a destination, and supplies the appropriate power to the destination. The PCS 10 includes a power converting unit 11, a direct current (DC) link unit 12, an inverter 13, a converter 14, and an integrated controller 15.

The power converting unit 11 is a device for converting power between the power generation system 2 and the DC link unit 12, and sends power generated by the power generation system 2 to the DC link unit 12. At this time, the power converting unit 11 converts a voltage output by the power generation system 2 into a DC link voltage.

The power converting unit 11 of the present embodiment may be configured as a power conversion circuit such as, for example, a converter or a rectifier circuit as appropriate for the type of the power generation system 2. When power generated by the power generation system 2 is DC power, the power converting unit 11 may be a converter for converting the DC power into DC power. On the other hand, when the power generated by the power generation system 2 is AC power, the power converting unit 11 may be, for example, a rectifier circuit for converting the AC power into DC power. In particular, when the power generation system 2 is a solar power generation system, the power converting unit 11 may include a maximum power point tracking (MPPT) converter for performing MPPT controlling to maximize power generated by the power generation system 2 according to variations in, for example, solar insulation or temperature. When the power generation system 2 does not generate any power, the power converting unit 11 may stop operating to minimize power consumed by a converter, or the like.

A magnitude of the DC link voltage may be unstable due to factors such as, for example, a sudden drop in voltage output by the power generation system 2 or the grid 3, generation of a peak load in the load 4, or the like. However, the DC link voltage may need to be stable for normal operations of the converter 14 and the inverter 13. The DC link unit 12 is coupled between the power converting unit 11 and the inverter 13 to maintain the DC link voltage as constant. The DC link unit 12 may be, for example, a large capacity capacitor.

The inverter 13 of the present embodiment is a power conversion device coupled between the DC link unit 12 and the first switch 30. The inverter 13 may convert the DC link voltage output from the power generation system 2 and/or the battery system 20 in a discharging mode into an AC voltage, and may output the AC voltage to the grid 3. Also, the inverter 13 may include a rectifier circuit for rectifying AC voltage of the grid 3, converting the AC voltage into the DC link voltage, and outputting the DC link voltage to store power of the grid 3 in the battery system 20 during a charging mode. Alternatively, the inverter 13 may be a bidirectional inverter in which directions of input and output may be changed.

The inverter 13 may include a filter for removing a harmonic wave from an AC voltage output to the grid 3. The inverter 13 may also include a phase locked loop (PLL) circuit for synchronizing a phase of the AC voltage output from the inverter 13 and a phase of an AC voltage of the grid 3 to either reduce the likelihood of reactive power being generated, or to prevent reactive power from being generated. The inverter 13 may also perform functions such as, for example, restriction of a voltage fluctuation range, improvement of a power-factor, elimination of a DC component, protection from transient phenomena, and the like. When the inverter 13 is not in use, the inverter 13 may stop operating to minimize power consumption.

The converter 14 of the present embodiment is a power conversion device coupled between the DC link unit 12 and the battery system 20, and includes a converter for DC-DC converting power stored in the battery system 20 into a voltage level appropriate for the inverter 13, that is, into the DC link voltage, and outputting the DC link voltage during a discharging mode. Also, the converter 14 of the present embodiment performs DC-DC converting of a voltage of power output from the power converting unit 11 or of power output from the inverter 13 into a voltage level appropriate for the battery system 20, that is, into a charging voltage, during a charging mode. Alternatively, the converter 14 may be a bidirectional converter in which directions of input and output may be changed. When the battery system 20 does not need to be charged or discharged, the converter 14 may stop operating to minimize power consumption.

The converter 14 of the present embodiment may control an amount of power supplied to the battery system 20, and may control an amount of current output from the battery system 20, due to the control of the integrated controller 15. Thus, the converter 14 may control an amount of current entering the battery system 20 and/or an amount of current discharged from the battery system 20.

The integrated controller 15 monitors states of the power generation system 2, the grid 3, the battery system 20, and the load 4, and controls operations of the power converting unit 11, the inverter 13, the converter 14, the battery system 20, the first switch 30, and the second switch 40 according to a result(s) of the monitoring and a algorithm(s) (e.g., a predetermined algorithm). The integrated controller 15 of the present embodiment may, for example, monitor whether there is a power failure in the grid 3, whether power is generated by the power generation system 2, an amount of power generated by the power generation system 2, a charging state of the battery system 20, an amount of power consumed by the load 4, a time, and the like. Also, when power to be supplied to the load 4 is insufficient, for example, when a power failure occurs in the grid 3, the integrated controller 15 may determine priorities with respect to power consumption devices included in the load 4, and may control the load 4 to supply power to the power consumption device having a high priority.

The integrated controller 15 of the present embodiment receives data related to a temperature of a battery from the battery system 20. If it is determined from the received data that the temperature of the battery is lower than, for example, a reference temperature, the integrated controller 15 controls a small amount of current (e.g., limits the current) to be applied to the battery when charging the battery. Similarly, if it is determined from the received data that the temperature of the battery is lower than the reference temperature, the integrated controller 15 controls a small amount of current (e.g., limits the current) to be discharged from the battery when discharging the battery. For this, the integrated controller 15 controls the converter 14 in a low-current mode to decrease a charging current by supplying only a small amount of power to the battery system 20 from the power generation system 2 or from the inverter 13. Alternately, the integrated controller 15 controls the converter 14 in a low-current mode to decrease a discharging current by supplying only a small amount of power to the inverter 13 from the battery system 20.

Additionally, although the integrated controller 15 is included in the PCS 10 in FIG. 2, the present invention is not limited thereto. For example, the integrated controller 15 of other embodiments of the present invention may be separately installed from the PCS 10, and may control each component included in the PCS 10.

The first switch 30 and the second switch 40 are coupled to each other in series between the inverter 13 and the grid 3, and control current flow between the power generation system 2 and the grid 3 by performing an on/off operation(s) under the control of the integrated controller 15. The on/off operation(s) of the first switch 30 and the second switch 40 may be controlled according to states of the power generation system 2, the grid 3, and the battery system 20.

In detail, when power of the power generation system 2 and/or the battery system 20 is supplied to the load 4, or when power of the grid 3 is supplied to the battery system 20, the first switch 30 is set to an on state. When power of the power generation system 2 and/or the battery system 20 is supplied to the grid 3, or when power of the grid 3 is supplied to the load 4 and/or the battery system 20, the second switch 40 is set to an on state.

When there is a power failure in the grid 3, the second switch 40 is set to an off state, and the first switch 30 is set to an on state. That is, power is supplied from the power generation system 2 and/or the battery system 20 to the load 4, and at the same time, the power supplied to the load 4 is prevented from flowing to the grid 3. Thus, accidents, such as a worker being shocked by a power line of the grid 3, may be prevented or reduced by preventing or avoiding transmission of power from the energy storage system 1.

The first switch 30 and the second switch 40 of the present embodiment may each be a switching device such as, for example, a relay capable of withstanding/accommodating a large capacity current.

The battery system 20 receives power of the power generation system 2 and/or the grid 3, stores the power therein, and supplies the stored power to the load 4 or the grid 3. The battery system 20 may include a part for storing power and a part for controlling and protecting the part for storing power. Hereinafter, the battery system 20 will be described in detail with reference to FIG. 3.

Figure 3:
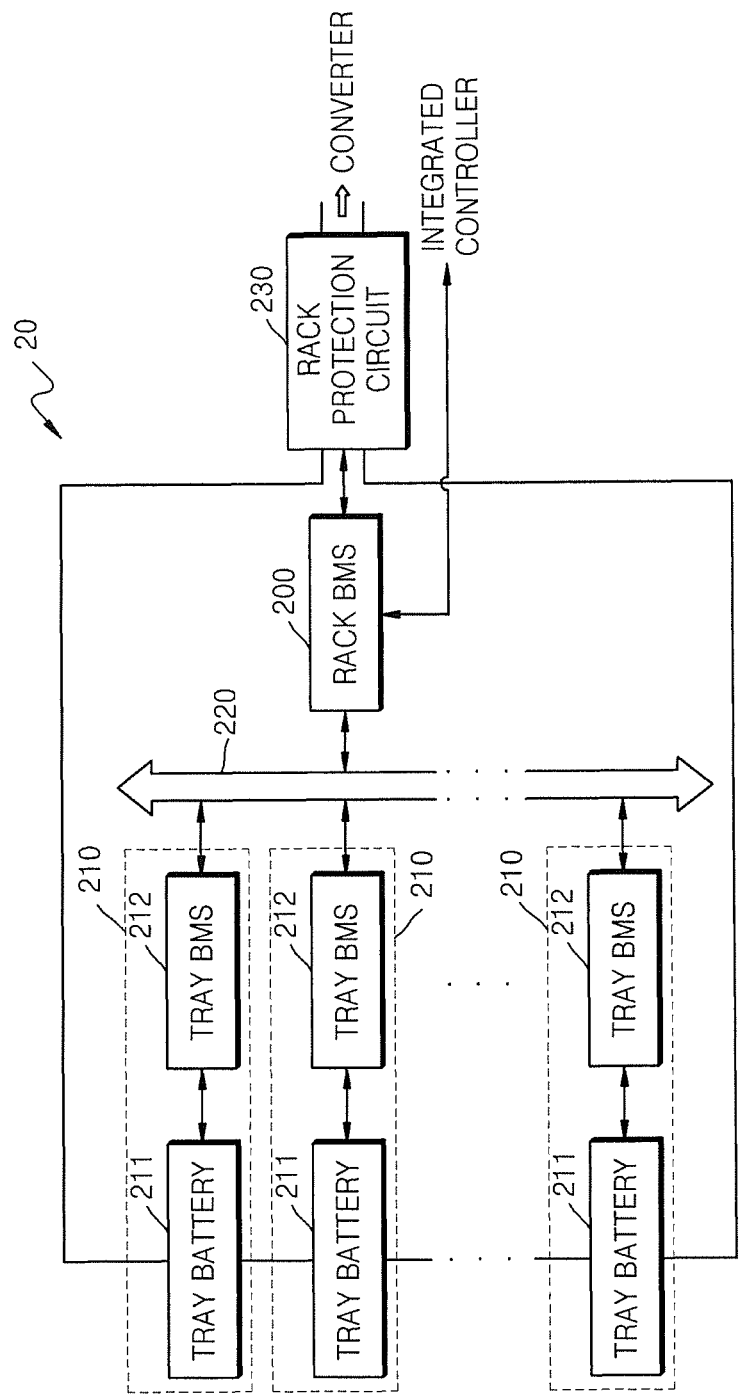
FIG. 3 is a block diagram of a configuration of a battery system, according to another embodiment of the present invention.

FIG. 3 is a block diagram of a configuration of a battery system 20, according to an embodiment of the present invention. The battery system 20 may include a battery rack as a subcomponent, and the battery rack may include a battery tray as a subcomponent. Hereinafter, the configuration of the battery system 20 will be described with reference to FIG. 3.

The battery system 20 may include a rack battery management system, or rack BMS (hereinafter, referred to as a rack controller) 200, a plurality of trays 210, a bus line 220, a rack protection circuit 230, etc.

The rack controller 200 controls charging and discharging operations of the battery system 20 by controlling the rack protection circuit 230, and also transmits to the integrated controller 15 data measured by monitoring states of the battery system 20 such as, for example, a temperature, a voltage, a current, etc.

Also, the rack controller 200 may receive the data measured by monitoring a plurality of tray batteries 211 using a plurality of tray battery controllers (e.g., tray battery management systems/tray BMSs) 212, which will be described later, and may analyze the data (the data being received from the tray controllers 212). The rack controller 200 may again transmit a control signal to the tray controllers 212 based on a result of the analysis. In addition, the rack controller 200 may transmit the data received from the tray controllers 212, or may transmit the result of analysis obtained from the data, to the integrated controller 15, and may transmit the control signal received from the integrated controller 15 to the tray controllers 212.

The plurality of trays 210, which are subcomponents of the battery rack, store power, and supply the stored power to the grid 3, the load 4, and the like. The plurality of trays 210 may each include the tray battery 211 and the tray controller 212.

The tray battery 211, which is a part for storing power, may include a battery cell as a subcomponent thereof. A number of the battery cells included in the tray battery 211 may be determined according to a voltage to be output from the tray battery 211. The battery cell may be any of various re-chargeable secondary batteries. Examples of a secondary battery that may be used as the battery cell may include a nickel-cadmium battery, a lead storage battery, a nickel metal hydride (NIMH) battery, a lithium ion battery, a lithium polymer battery, and the like.

The tray batteries 211 have lower charging and discharging efficiencies at a low temperature when compared to the tray batteries 211 at a room temperature. The charging and discharging efficiencies of the tray batteries 211 may return to normal by heat generated from a battery cell when the tray batteries 211 are charged and discharged. This phenomenon may be particularly apparent when a lithium-ion battery is used as the battery cell.

Charging and discharging operations of the tray batteries 211 are controlled by the tray controllers 212. The tray batteries 211 may be coupled to one another in series so as to generate an output voltage appropriate for the battery system 20. Power lines extend from the tray batteries 211 that are located at two ends from among the tray batteries 211 coupled to one another in series so that power may be supplied to the converter 14 via the rack protection circuit 230.

The tray controllers 212 control the charging and discharging operations of the trays batteries 211. The tray controllers 212 also monitor states of the trays batteries 211 such as, for example, temperatures, voltages, currents, and the like. The tray controllers 212 transmit results of the monitoring to the rack controller 200. The tray controllers 212 may also receive control signals from the rack controller 200, and may perform operations according to the control signals.

The bus line 220 is a path for transmitting data or commands between the rack controller 200 and the tray controllers 212. A communication protocol between the rack controller 200 and the tray controllers 212 may be controller area network (CAN) communication. However, the present invention is not limited thereto, and any communication protocol for transmitting data or commands by using a bus line may be used.

The rack protection circuit 230 may block power supply under the control of the rack controller 200. The rack protection circuit 230 may also measure a voltage and a current of the battery system 20, and may transmit a result of the measurement to the integrated controller 15. For example, the rack protection circuit 230 may include a relay, a fuse, or the like, for blocking a current. The rack protection circuit 230 may also include one or more sensors for measuring a voltage, a current, etc.

In the present embodiment, although it has been described that the rack controller 200 and the tray controllers 212 communicate with each other by using the bus line 220, the present invention is not limited thereto. For example, the rack controller 200 may communicate with each of the tray controllers 212 (e.g., directly). Alternatively, the tray controllers 212 may perform a serial communication with one another. In other words, any communication protocol for transmitting data and commands between the rack controller 200 and the tray controllers 212 may be used.

In the present embodiment, a case where the battery system 20 includes a single battery rack has been described. However, this is just an example, and a plurality of battery racks may be coupled to one another in series or in parallel according to a voltage or a capacity desired by a user to constitute a single battery system. When the battery system 20 includes a plurality of battery racks, the battery system 20 may further include a system controller (e.g., a system battery management system, or system BMS) for controlling the plurality of battery racks.

Hereinafter, controlling of charging and discharging currents by operations of the integrated controller 15 and the rack controller 200 will be described in detail.

Figure 4:
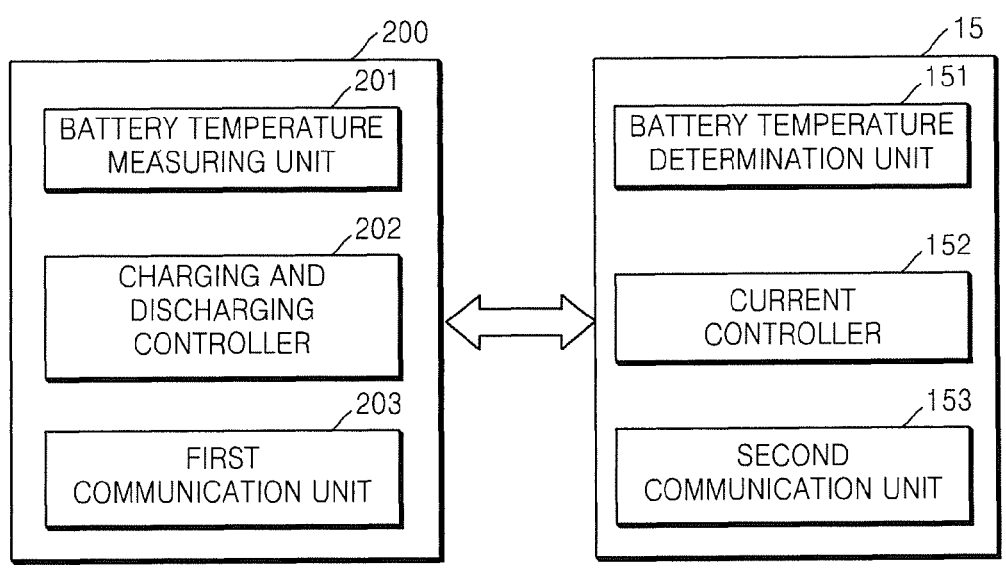
FIG. 4 is a block diagram of an integrated controller and a rack controller (e.g., a rack battery management system (BMS)), according to another embodiment of the present invention.

FIG. 4 is a block diagram of configurations of the integrated controller 15 and the rack controller 200, according to an embodiment of the present invention.

Referring to FIG. 4, the rack controller 200 includes a battery temperature measuring unit 201, a charging and discharging controller 202, and a first communication unit 203.

The battery temperature measuring unit 201 measures a temperature of the battery. In this regard, the battery temperature measuring unit 201 may directly measure the temperature of the battery, and may use temperature data transmitted from the tray controllers 212. The battery temperature measuring unit 201 may measure the temperature of the battery periodically, wherein a measuring period may be adjusted by a user, or may measure the temperature of the battery according to a control signal. Alternatively, the battery temperature measuring unit 201 may measure the temperature of the battery in real time.

The charging and discharging controller 202 controls the battery trays 211 to be charged in a charging mode by using power supplied from the converter 14. Also, the charging and discharging controller 202 controls power charged to and stored in the battery trays 211 to be discharged to the converter 14 during a discharging mode.

The first communication unit 203 transmits the temperature data measured by the battery temperature measuring unit 201 to the integrated controller 15, and may repeatedly transmit the temperature data to the integrated controller 15 at intervals or at a period (e.g., a predetermined period). Alternatively, the first communication unit 203 may transmit the temperature data when receiving a control signal from the integrated controller 15, for example, a temperature data transmission signal.

The integrated controller 15 includes a battery temperature determination unit 151, a current controller 152, and a second communication unit 153.

In the present embodiment, the battery temperature determination unit 151 compares the temperature data transmitted from the rack controller 200 with a reference temperature, and determines whether the temperature of the battery is lower than the reference temperature. The reference temperature is a temperature at which charging and discharging efficiencies of the battery cell are relatively decreased as compared to battery cells of an adjacent section. For example, the reference temperature may be 0° C. The reference temperature may be different according to types and characteristics of the battery cell. Accordingly, the reference temperature may be set and adjusted by a user.

If it is determined that the temperature of the battery is lower than the reference temperature as a result of the determination by the battery temperature determination unit 151, the current controller 152 controls the converter 14 to be operated in a low-current mode, to perform low-current charging and discharging operations.

On the other hand, as a result of the determination by the battery temperature determination unit 151, if it is determined that the temperature of the battery is equal to or higher than the reference temperature, the current controller 152 may control the converter 14 to be operated in a normal mode, to perform normal charging and discharging operations.

The second communication unit 153 may receive the temperature data from the rack controller 200 via the first communication unit 203, and may transmit a control signal to command transmission of the temperature data to the first communication unit 203. Alternatively, the rack controller 200 may periodically transmit the temperature data, and the second communication unit 153 may simply receive the transmitted temperature data.

Figure 5A:
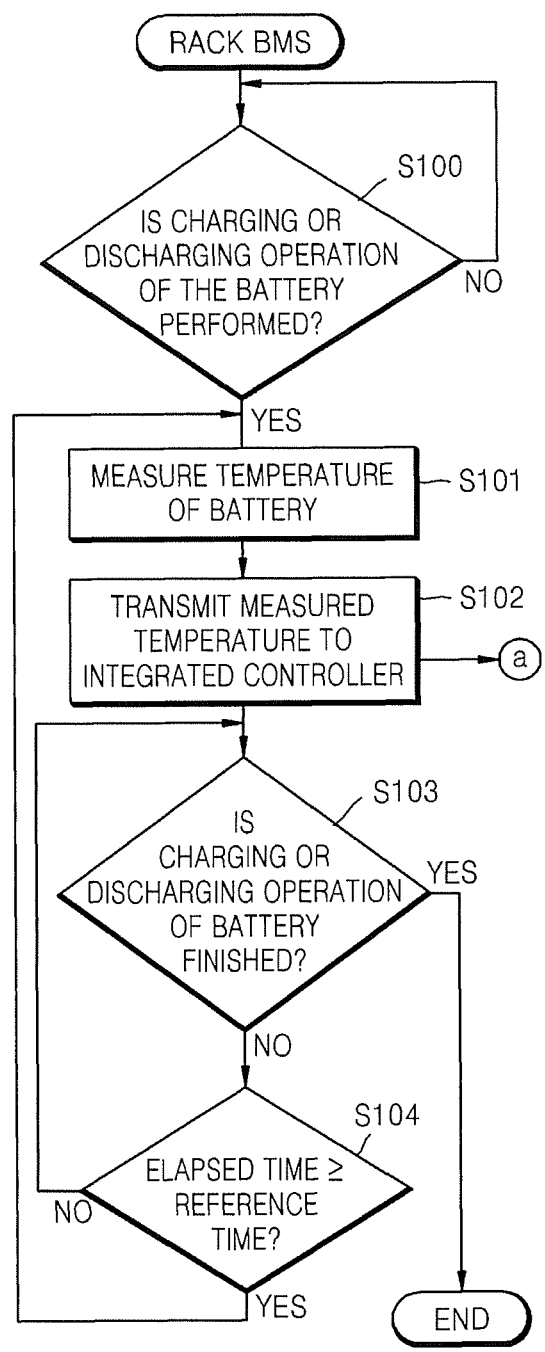
FIGS. 5A and 5B are flowcharts illustrating a method of controlling an energy storage system, according to another embodiment of the present invention.
Figure 5B:
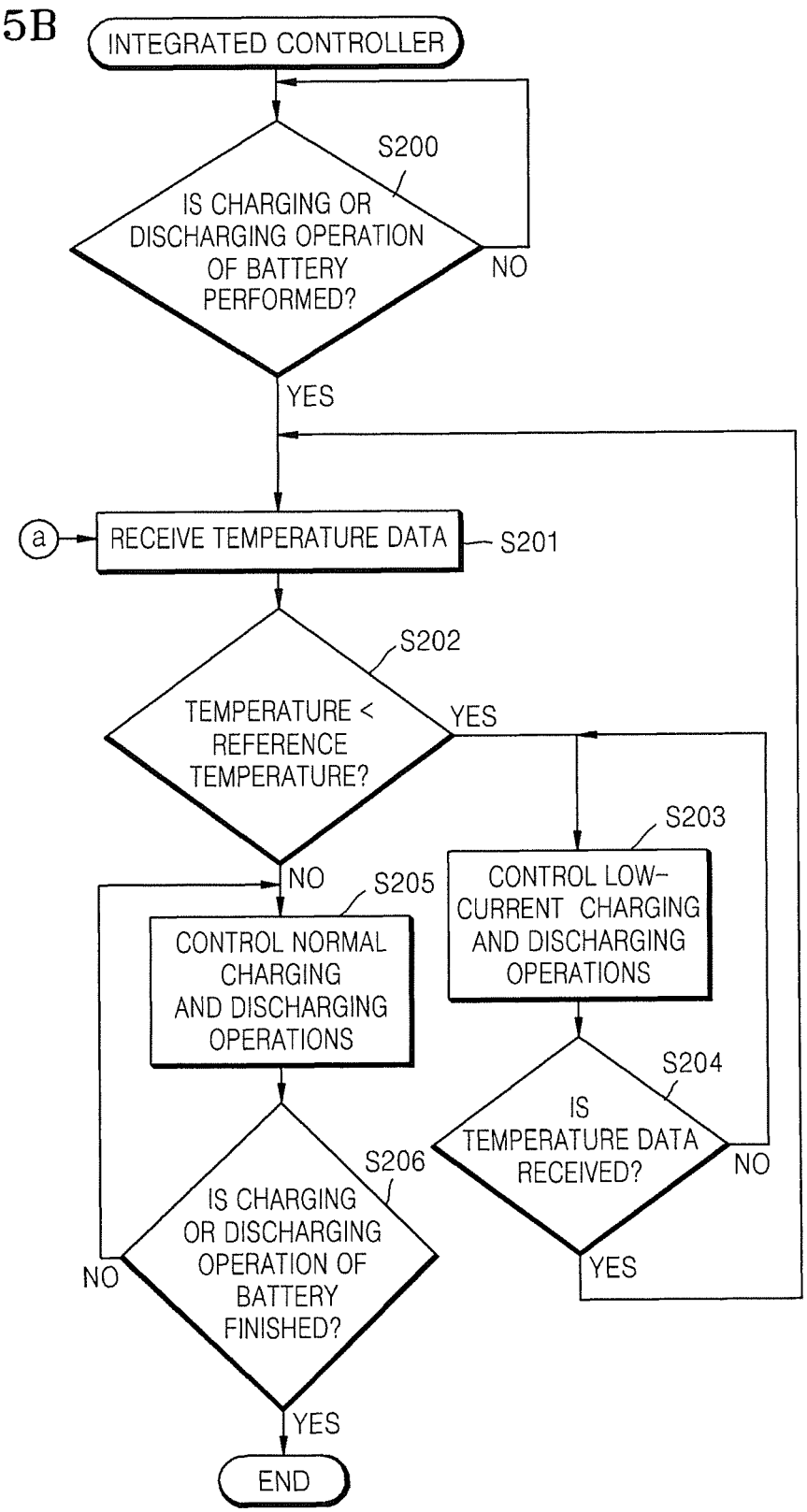

FIGS. 5A and 5B are flowcharts showing a method of controlling the energy storage system 1, according to an embodiment of the present invention.

Referring to FIGS. 5A and 5B, the rack controller 200 and the integrated controller 15 individually perform a different operation at the same time. First, an operation of the rack controller 200 will be described with reference to FIG. 5A.

The rack controller 200 determines whether or not a charging or discharging operation of the battery is performed (S100). When the charging operation and the discharging operation of the battery are not performed, the rack controller 200 is in a standby state. Although not shown in the drawing, the rack controller 200 may continuously perform various monitoring operations until the charging operation or the discharging operation of the battery is performed.

When the rack controller 200 determines that a charging or discharging operation of the battery is performed, the battery temperature measuring unit 201 measures a temperature of the battery (S101). In the present embodiment, the battery temperature measuring unit 201 measures the temperature of the battery when the charging or discharging operation of the battery is performed. However, the present invention is not limited thereto, and the battery temperature measuring unit 201 may consistently perform measuring of the temperature of the battery. Also, at this time, the charging and discharging controller 202 control the charging and discharging operations of the battery tray 211.

The first communication unit 203 transmits the temperature data measured by the battery temperature measuring unit 201 to the integrated controller 15 (S102).

The rack controller 200 determines whether a charging or discharging operation is finished (S103). If it is determined that the charging or discharging operation is finished, the rack controller 200 may finish operations such as controlling the charging or discharging operation or measuring a temperature.

On the other hand, if it is determined that the charging or discharging operation is not finished, the rack controller 200 determines whether a reference time has elapsed from the point in time of measuring of the temperature (S104). When a time greater than a reference time has elapsed, the battery temperature measuring unit 201 measures the temperature again (S101), and transmits the measured temperature to the integrated controller 15 (S102). That is, the method returns to operation S101.

Accordingly, the rack controller 200 performs charging and discharging operations through the above-described operations.

Hereinafter, operations of the integrated controller 15 will be described with reference to FIG. 5B.

The integrated controller 15 also determines whether a charging or discharging operation of the battery is performed (S200). When the charging operation and the discharging operation of the battery are not performed, the integrated controller 15 is in a standby state. Although not shown in FIG. 5B, the integrated controller 15 may control the power converting unit 11, the inverter 13, and the like.

When it is determined that the charging or discharging operation of the battery is performed, the second communication unit 153 receives temperature data from the rack controller 200 (S201). Then, the battery temperature determination unit 151 determines whether a temperature of the battery is lower than a reference temperature based on the received temperature data (S202).

If it is determined that the temperature of the battery is lower than the reference temperature, the current controller 152 controls low-current charging and discharging operations to avoid a charging or discharging operation being performed in the battery tray 211 with a low efficiency (S203). Then, it is repeatedly (e.g., continuously) determined whether new temperature data is received from the rack controller 200 (S204).

If new temperature data is received from the rack controller 200, the method returns to operation S201 and may perform operations S201 to S206.

When battery temperature determination unit 151 determines that the temperature of the battery is not less than the reference temperature, even if a general charging or discharging operation is performed, there is a low power loss due to the charging or discharging operation. Accordingly, the current controller 152 controls the normal charging and discharging operations (S205).

Then, it is determined whether the charging or discharging operation is finished (S206). If it is determined that the charging or discharging operation is finished, controlling of the charging or discharging is finished, and the operations of the converter 14 may be stopped.

If the charging or discharging operation is not finished, the charging or discharging operation continues. In this case, since once the temperature of the battery is increased beyond the reference temperature, it is not necessary to receive temperature data again. Accordingly, the method may forgo returning to operation S201, and may instead return to operation S205 to continue the charging or discharging operation.

The integrated controller 15 performs charging discharging operations through the above-described operations.

As described above, in the energy storage system 1 according to the present embodiment of the present invention, when at a low temperature, charging and discharging operations of a battery may be performed in a low-current mode, and when within a selected (e.g., predetermined) temperature range, the charging and discharging operations of the battery may be performed in a normal mode. Accordingly, charging and discharging efficiencies of the battery may be increased, thereby decreasing power loss during the charging and discharging operations.

The particular implementations shown and described herein are illustrative examples of the invention, and are not intended to otherwise limit the scope of the invention in any way. For the sake of brevity, conventional electronics, control systems, software development, and other functional aspects of the systems might not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better describe the embodiments of the invention, and does not pose a limitation on the scope of the invention unless otherwise claimed. Numerous modifications and adaptations will be readily apparent to those skilled in this art without departing from the spirit and scope of the present invention.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An energy storage system configured to be coupled to at least one of a power generation system which is a system for generating power using an energy source, a grid comprising a power generating station, or a load, the energy storage system comprising:
    a battery system comprising at least one rack, the at least one rack comprising a rack controller configured to obtain a temperature of at least one battery; and
    a system controller configured to control a charging operation and a discharging operation of the at least one battery on the at least one rack in accordance with the obtained temperature of the at least one battery received from the rack controller, the system controller comprising a battery temperature determination unit and a current controller, the battery temperature determination unit being configured to compare the obtained temperature with a reference temperature, and the current controller being configured to:
        control a first current discharging operation of the at least one battery at a first current when the obtained temperature is greater than or equal to the reference temperature; and
        control a second current discharging operation at a second current when the obtained temperature is less than the reference temperature,
    wherein the first current is greater than the second current,
    wherein the rack further comprises at least one battery tray on which the at least one battery is located, the at least one battery tray comprising a tray controller, and
    wherein the rack controller is configured to receive the obtained temperature of the at least one battery from the tray controller of the at least one battery tray corresponding to the at least one battery.

2. The energy storage system of claim 1, wherein the rack controller is configured to obtain the temperature of the at least one battery when the charging operation or the discharging operation is performed.

3. The energy storage system of claim 1, wherein the rack controller is configured to transmit the obtained temperature to the system controller periodically.

4. The energy storage system of claim 1, wherein the rack controller is configured to transmit the obtained temperature to the system controller in response to a command from the system controller to transmit the obtained temperature.

5. The energy storage system of claim 1, wherein the rack controller is further configured to determine whether or not more than a reference time has elapsed since the obtaining of the temperature, and to obtain the temperature again and transmit the obtained temperature to the system controller when more than the reference time has elapsed.

6. The energy storage system of claim 1, wherein the reference temperature is selectable.

7. The energy storage system of claim 1, wherein the system controller is configured to change the first current to the second current when the obtained temperature becomes greater than or equal to the reference temperature.

8. The energy storage system of claim 1, wherein the system controller is configured to determine receipt of the obtained temperature from the rack controller.

9. The energy storage system of claim 1, further comprising a converter configured to change a current, wherein the current controller is configured to control the converter to determine current level between the first current and the second current.

10. The energy storage system of claim 1, wherein the rack controller comprises a temperature measuring unit configured to obtain the temperature of the at least one battery.

11. The energy storage system of claim 1, further comprising a rack bus, wherein the rack controller and the tray controller of the at least one battery tray are configured to communicate with each other via the rack bus.

12. The energy storage system of claim 1, wherein the battery system further comprises a rack protection circuit configured to block power supply under control of the rack controller.

13. The energy storage system of claim 12, wherein the rack protection circuit is further configured to obtain a voltage and a current of the battery system, and to transmit the obtained voltage and the obtained current to the system controller.

14. A method of controlling discharging of a battery in an energy storage system comprising: a system controller; and a rack comprising a rack controller, the rack comprising a battery tray on which the battery is arranged and which comprises a tray controller, the energy storage system being configured to be coupled to at least one of a power generator for generating power using an energy source, a grid comprising a power generating station, or a load, the method comprising:
    obtaining a temperature of the battery arranged on the battery tray;
    transmitting the obtained temperature from the tray controller to the rack controller and then from the rack controller to the system controller;
    comparing the obtained temperature of the battery with a reference temperature; and
    controlling a discharging operation of the battery in accordance with the obtained temperature,
    wherein the battery undergoes a second-current discharging operation when the obtained temperature is less than the reference temperature, and undergoes a first-current discharging operation when the obtained temperature is greater than or equal to the reference temperature, and
    wherein a second current corresponding to the second-current discharging operation is less than a first current corresponding to the first-current discharging operation.

* * * * *